United States Patent [19]

Kerner et al.

[11] Patent Number: 5,120,914
[45] Date of Patent: Jun. 9, 1992

[54] STEERING COLUMN SWITCH FOR MOTOR VEHICLES

[75] Inventors: Wolfgang Kerner, Erlenbach; Adam Weber, Bietigheim-Bissingen, both of Fed. Rep. of Germany

[73] Assignee: SWF Auto-Electric GmbH, Bietigheim-Bissingen, Fed. Rep. of Germany

[21] Appl. No.: 572,972

[22] PCT Filed: Nov. 24, 1989

[86] PCT No.: PCT/EP89/01423
§ 371 Date: Jul. 27, 1990
§ 102(e) Date: Jul. 27, 1990

[87] PCT Pub. No.: WO90/06245
PCT Pub. Date: Jun. 14, 1990

[30] Foreign Application Priority Data

Dec. 2, 1988 [DE] Fed. Rep. of Germany ....... 3840655

[51] Int. Cl.$^5$ .............................................. H01H 9/16
[52] U.S. Cl. ................................. 200/61.54; 200/313
[58] Field of Search .......... 200/61.54, 61.27, 311-315, 200/316, 310; 116/DIG. 5, DIG. 26

[56] References Cited

U.S. PATENT DOCUMENTS 2,469,274 5/1949 Rein ..................................... 200/314
4,408,104 10/1983 Iwata et al. ...................... 200/61.54

FOREIGN PATENT DOCUMENTS 1052532 1/1954 France .
2111907 6/1972 France .
2503646 10/1982 France .
1178647 1/1970 United Kingdom .

Primary Examiner—J. R. Scott
Attorney, Agent, or Firm—Robert P. Seitter; J. Gordon Lewis

[57] ABSTRACT

A steering column switch for motor vehicles includes a switch housing and a switch lever mounted therein which may be pivoted about an axis together with a switching member, which switch lever is provided with at least one read-out panel which may be illuminated by a light guide traversing the switch lever, which light guide is aligned with a light source by a light-input area. The light source is fitted and protected in the switch housing; it is free from hard switching-on and switching-off impacts of the switch lever. In particular, it is arranged centrally around the pivotal axis of the switch lever and switching member, so that it is possible to illuminate the read-out panel with the same intensity in all switching positions of the switch lever relative to the pivotal axis.

35 Claims, 3 Drawing Sheets

STEERING COLUMN SWITCH FOR MOTOR VEHICLES

TECHNICAL FIELD

The present invention relates to a steering column switch for motor vehicles having a switch housing and a switch lever mounted therein to be pivoted about a pivotal axis together with a switching member, which switch lever has at least one read-out panel which may be fully illuminated by a light guide extending along the switch lever, which light guide is aligned to a light source by a light-input area.

BACKGROUND OF THE INVENTION

Since it has become normal practice for a long time to equip electric switches arranged on a motor vehicle instrument panel with a lighting system, steering column switches with illumination have also been used in particular vehicle models in the last few years. A steering column switch with illuminated switch lever is known from the printed specification of European patent 0 160 905. Several light emitting diodes are arranged as light sources in the switch lever of the steering column switch according to that printed specification. Among other things, it is disadvantageous to arrange a light source in the switch lever because the light source is then exposed to hard impacts as the switch lever is switched on and.

A steering column switch has also become known in which the switch lever includes read-out panels, which may be illuminated by light guides extending along the switch lever and which are aligned to a light source by a light-input area. In a construction of this kind the light source can in principle be arranged in any desired place.

The present invention addresses the problem of arranging a light source, from which at least one light guide is conducted to at least one read-out panel in the switch lever of a steering column switch, in such a way that the light source is protected and that together with the steering column switch a compact structural unit is formed.

SUMMARY OF THE INVENTION

This problem is solved by a steering column switch constructed in accordance with the present invention.

A construction is preferred in which the entire light guide including the light input area is held on the switch lever and switching member and can be pivoted together with the switch lever and switching member. This has the advantage that the light guide is not continuously bent to and fro when the switch lever and switching member are jointly pivoted.

It is of special advantage to arrange the light source centrally around the pivotal axis of the switch lever and switching member. In such an arrangement the relative position between the light source and the light input area of the light guide is the same with regard to the pivotal axis mentioned in every switching position of the switch lever and the read-out panel can be illuminated with the same intensity in every switching position of the switch lever. It is conceivable, for example, to axially align the end of the light guide which is close to the light source and to put it on the pivotal axis. Because the switch lever protrudes more or less radially from the switch housing towards the pivotal axis, it is more favorable if, the light guide is radially aligned with the light source around the pivotal axis of the switch lever. When the switch lever is pivoted, the light-input area of the light guide is moved around the light source with constant spacing.

Normally the switch lever, in particular the switching member, is mounted on the switch housing by at least one bearing pin and one bearing ring. In principle it is possible that, looked at from the switching member in the axial direction, the light source is located in the switch housing beyond the bearing pin and bearing ring. However it is more favorable, if the bearing pin has a hollow, in which the light source can be fitted or into which the light source can project. Thus a compact mode of construction is achieved. Furthermore the end of the light guide which is close to the light source can be close to the switch lever. Preferably, a hollow bearing pin or a bearing ring on the switching member is closed by a bottom to form a hollow in the switching member into which hollow the switch lever projects. Thereby the light source is almost completely covered in its hollow, so that no external light can emerge.

The hollow in which the light source is located is accessible for the light guide through an opening. Preferably, the bearing pin and bearing ring overlap in the vicinity of the light guide in the axial direction. If the bearing ring and bearing pin overlap in the vicinity of the light guide, the opening in the bearing element attributed to the switch housing is so big, that, when the switch lever and switching member are rotated in the opening the light guide is moved in a peripheral direction relative to the pivotal axis of the switch lever.

The light guide can be fixed in the switching member by its end close to the light source. It is however also conceivable to fix it on the switch lever. This is preferred if the switch lever can be pivoted relative to the switching member about a second pivotal axis extending perpendicularly to the pivotal axis in common. In order to allow actuation of the switch lever without strain for the light guide, the end of the light guide close to the light source can be moved relative to the switching member and switch housing when the switch lever is pivoted about the second pivotal axis. Thus in particular the openings in the bearing pin and bearing ring are so big that they permit movement of the light guide when the switch lever is pivoted about a second pivotal axis.

In order to assure that no external light can emerge from the openings in the bearing pin and bearing ring, these openings are preferably covered by the switch lever.

In its longitudinal direction the light guide can be fixed in a particularly simple way, if it has a wedge located near one end by which wedge the light guide is positioned in a corresponding recess. This arrangement of the light guide longitudinally can also be advantageously applied independently of other features of the present invention.

Two embodiments of a steering column switch according to the present invention are shown in the drawings. The invention will now be described in detail by reference to these drawings, in which:

DETAILED DESCRIPTION

Figure 1:
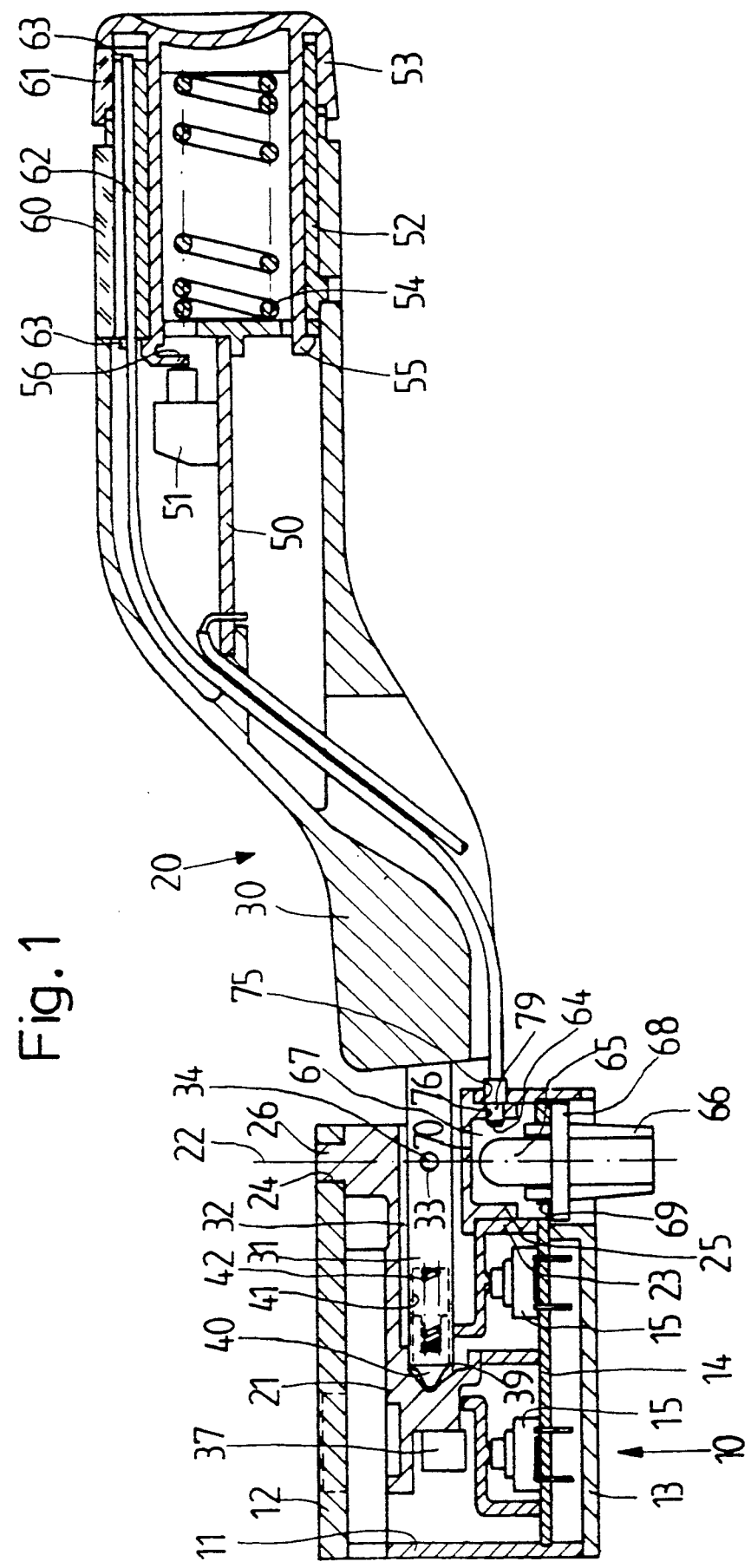
FIG. 1 is a longitudinal section through a first embodiment of the present invention, in which the light source is put in a separate holder inserted in the switch housing.
Figure 2:
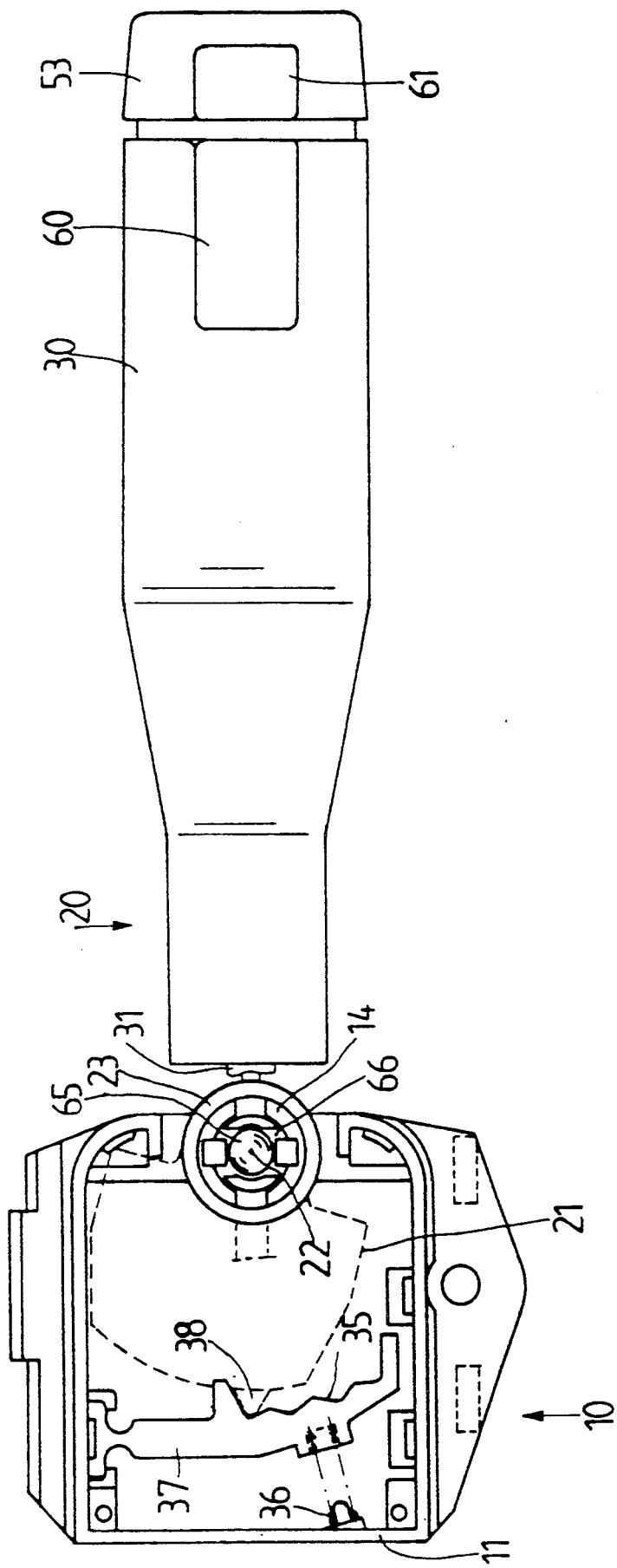
FIG. 2 is a top view of the embodiment shown in FIG. 1, with the cover removed from the switch housing.

The housing 10 of the steering column switch shown in FIGS. 1 and 2 has a rectangular frame 11, which at one side is closed by a cover 12 and at the other side by a bottom 13. In the interior of the switch housing 10 is located a plate 14 spaced from the bottom 13, which plate carries several microswitches 15 which can be operated by pivoting the switch lever 20 and of which two can be recognized in FIG. 1. A switching member 21 is mounted in the housing 10 in such a way that it can be pivoted about an axis 22, which in FIG. 2 is shown perpendicular to the drawing plane. The frame 11 and the cover 12 have two bearing rings 23 and 24, respectively, for mounting purposes, the axes of which bearing rings are flush with each other. However the internal diameter of the bearing ring 23 in the frame 11 is much larger than the internal diameter of the bearing ring 24 in the cover 12. The switching member 21 engages the two bearing rings through two bearing pins 25 and 26, respectively. The external diameters of the bearing pins 25 and 26 are adapted to the internal diameters of the bearing rings 23 and 24. Whereas the bearing pin 26 is made of solid material, the bearing pin 25 is hollow and only its cylindrical wall fits inside the bearing ring 23 of the frame 11.

The switch lever has a plastic support 30 into which is pressed a thin metal pin 31 projecting into a hollow or bore 32 of the switching member 21. The metal pin 31 and thus the entire switch lever 20 is supported relative to the switching member 21 through a bearing pin 33 in such a way that lever 20 may be pivoted about an axis 34 relative to the switching member 21, which axis 34 crosses the axis 22 perpendicularly. When operated perpendicularly to the drawing plane of FIG. 1, which is usually designated as operation in a horizontal plane, the switch lever 20 is thus always moved together with the switching member 21. When operated perpendicularly to the horizontal plane, which is usually designated as operation in a vertical plane, the switch lever is moved alone. In the horizontal plane the various switching positions of the switch lever 20 and of the switching member 21 are defined by a locking curve 35, which is positioned on a pivotal locking lever 37 being supported on the switch housing 10 through a spring 36. In the vertical plane the switching positions of the switch lever 20 are defined by a locking curve 39 on the switching member 21 and by a locking pin 40, which projects from a pocket bore 41 located on the side of the metal pin 31 facing away from the plastic support 30 and is supported on the bottom of the said pocket bore 41 by a pressure spring 42.

The plastic support 30 of the switch lever 20 is hollow to a substantial extent. Within its interior, support 30 contains a printed circuit board 50, on which a microswitch 51 and possibly other electric components not shown in detail are fitted. On the open front side of support 30 opposite the switch housing 10, a structural unit is fitted in the plastic support 30. The structural unit includes a fastening sleeve 52, a push button 53 which can be displaced relative to the fastening sleeve in the longitudinal direction of the switch lever 20 and is fixed on the fastening sleeve 52, and a helical compression spring 54 which is supported between fastening sleeve 52 and push-button 53. The push-button 53 extends beyond the bottom of the fastening sleeve 52 where detents 55 ensure attachment a finger 56 can operate the microswitch 51.

On the side which faces the vehicle driver, the plastic support 30 has a read-out panel 60 adjacent the push-button 53, which read-out panel abuts a read-out panel 61 on the push-button 53. Both read-out panels 60 and 61 are illuminated by a flexible light guide 62, which is positioned behind the read-out panels 60 and 61 by the fastening sleeve 52. In the longitudinal direction the light guide 62 is fixed on the fastening sleeve 52 by means of wedges 63. Inside the plastic support the light guide 62 extends to the switch housing 10, where light radiated from a light source 65 enters the light guide 62. The light source 65 is an incandescent lamp which is secured in a separate holder 66 and together with the latter it is fitted in the switch housing through an opening in the bottom 13. The incandescent lamp projects through an aperture in the plate 14 into the hollow 67 of the bearing pin 25. The axis of the incandescent lamp 65 coincides with the pivotal axis 22 of the switch lever 20 and of the switching member 21. The incandescent lamp 65 is held in the switch housing 10 by a tapered fit between holder 66 and plate 14. A flange 68 on the holder 66 covers the aperture 69 in the plate 14 towards the outside. The hollow 67 in the bearing pin 25 is also closed, towards the hollow 32 in the switching member 21, by a bottom 70. Thereby external light is prevented from emerging between switch housing 10 and switch lever 20.

In order to assure that the light guide 62 can reach the hollow 67 in which the incandescent lamp 65 is positioned, the bearing ring 23 has an opening 75 at the side facing the plastic support 30 of the switch lever and the bearing pin 25 has an opening 76, which receives the light guide using a snug fit and through which, with respect to the pivotal axis 22, the light guide 62 is radially aligned with the incandescent lamp 65. When the switch lever 20 and the switching member 21 are pivoted about the axis 22 the end 79 of the light guide 62 facing the incandescent lamp 65 is carried along by the bearing pin 25. Because the incandescent lamp 65 is centrally arranged and faces light-input area 64 on end 79, the illumination of the read-out panels 60 and 61 is not affected. The opening 75 in the bearing ring 23 is sufficiently large in the peripheral direction of the pivotal axis 22 that the bearing pin 25 can carry the light guide 62 without impedance.

When the switch lever is pivoted in the vertical plane, the end of the light guide 62 close to the incandescent lamp 65 retains its position, because it is fixed on the switching member through a snug fit in the opening 76 of the bearing pin 26. The small angular movement of the switch lever 20 is compensated by a slightly changed position of the light guide 62 within the plastic support 30.

Figure 3:
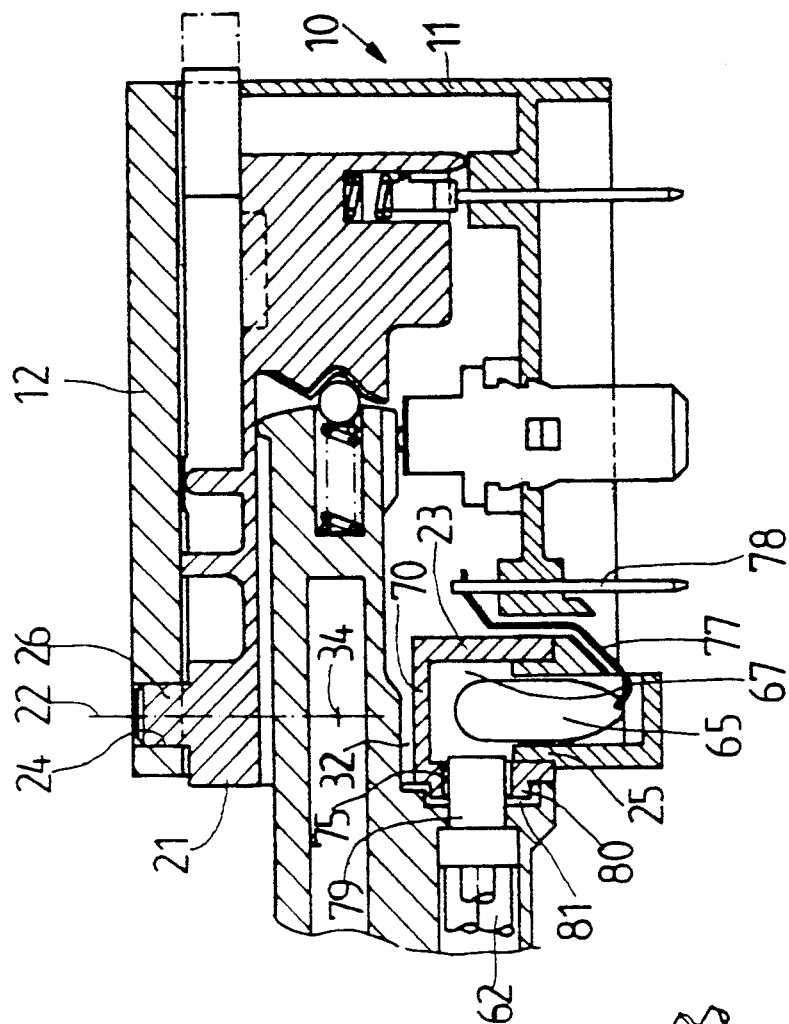
FIG. 3 is a section similar to that of FIG. 1 through the second embodiment of the present invention in which the light source is directly inserted in the switch housing.
Figure 3:
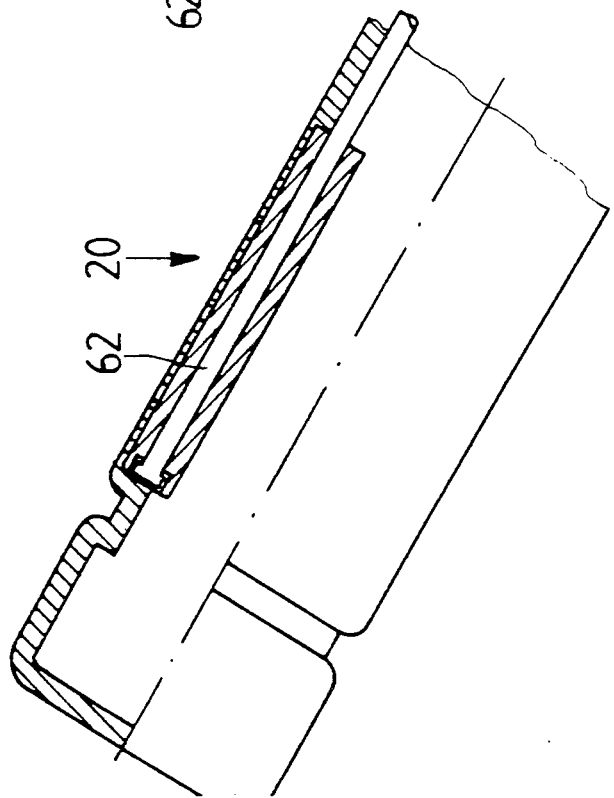

In the embodiment shown in FIG. 3, the frame 11 of a housing 10 also includes a bottom and is only closed by a cover 12. Similar to the construction according to FIGS. 1 and 2 a switching member 21 is supported by bearing pins 25 and 26 and bearing rings 23 and 24 in such a way that it may be pivoted together with the switch lever 20 in a horizontal plane about the axis 22. In addition the switch lever 20 can also be pivoted relative to the switch housing 10 and the switching member 21 about an axis 34 in a vertical plane.

With regard to bearing ring 24 and bearing pin 26 the switching member 21 is similarly supported in the switch housing 10 as in the embodiment shown in FIGS. 1 and 2. However the hollow bearing pin 25, in constrast to the embodiment shown in FIGS. 1 and 2, is formed on the frame 11 of the switch housing 10 and fits inside bearing ring 23 on the switching member 21. The bearing ring 23 is closed by a bottom 70, similar to the pin 25 of FIGS. 1 and 2, towards a hollow 32 in the switching member 21 for receiving the switch lever 20. A capless incandescent lamp 65 is used as a light source, the connecting wires 77 of which are soldered with plug terminals 78 fitted in the housing 10. The incandescent lamp is again centrally arranged around the axis 22 in the space 67 formed by the bearing ring 23 and the hollow pin 25. Lamp 65 projects farther into the bearing ring than the bearing pin 25.

On the side of the bearing ring 23 extending in the direction of the switch lever 20 between the bottom 70 and the bearing pin 25 is located an opening 75, through which the combined end 79 of several light guides 62 extends into the hollow 67. In contrast to the embodiment shown in FIGS. 1 and 2, in the embodiment shown in FIG. 3 there is thus only one opening for the light guide necessary in the bearing element of the switching member 21, namely in the bearing ring 23.

In contrast to the embodiment shown in FIGS. 1 and 2, in the embodiment shown in FIG. 3 the end 79 of the light guide 62 is not fixed on the switching member 21, but on the switch lever 20. The opening 75 in the bearing ring 23 is somewhat larger than the cross-section of the end 79 of the light guide 62, so that the end can move in the opening 75 when the switch lever 20 is pivoted about the axis 34 relative to the switching member 21.

In order to ensure that no light can emerge, the opening 75 is covered by the switch lever 20 in the manner of a mesh. The opening 75 is surrounded by a collar 80 which projects in a circumferential recess 81 on the switch lever 20.

What we claim is:

1. A steering column switch for motor vehicles comprising:
   a switch housing;
   a switching unit mounted for pivotal movement about a first axis extending through said housing, said switching unit including:
      (a) a switching member mounted within said switch housing, and
      (b) a switch lever attached to said switching member;
   at least one read-out panel mounted in a surface of said switch lever;
   a light source within said switch housing; and
   light conducting means extending through said switch lever from said light source to said read-out panel for conducting light from said light source to said read-out panel.

2. A steering column switch as claimed in claim 1 wherein a first end of said light conducting means at which light from said light source enters said light conducting means is attached to said switching member.

3. A steering column switch as claimed in claim 2 wherein said light source is disposed along said first axis.

4. A steering column switch as claimed in claim 3 wherein said light conducting means is aligned radially, with respect to said first axis, with said light source.

5. A steering column switch as claimed in claim 4 further comprising:
   at least one bearing pin located on said housing and having a hollow portion in which said light source is located; and
   at least one bearing ring located on said housing and engaging said bearing pin for pivotably mounting said switch lever within said housing.

6. A steering column switch as claimed in claim 5 further comprising a bottom positioned on said bearing pin wherein:
   said switching member contains a bore into which said switch lever projects; and
   said bottom closes the end, facing said bore, of said bearing pin.

7. A steering column switch as claimed in claim 5 further comprising a bottom positioned on said bearing ring wherein:
   said switching member contains a bore into which said switch lever projects; and
   said bottom closes the end, facing said bore, of said bearing ring.

8. A steering column switch as claimed in claim 5 wherein:
   said bearing pin has an opening disposed perpendicular to said first axis providing access to said hollow portion of said bearing pin in which said light source is located; and
   said light conducting means is positioned inside said opening.

9. A steering column switch as claimed in claim 8 wherein said light conducting means is movable in said opening of said bearing pin in a direction perpendicular to said first axis.

10. A steering column switch as claimed in claim 8 wherein said switch lever covers said opening of said bearing pin through which said light conducting means reaches said light source.

11. A steering column switch as claimed in claim 10 wherein said switch lever forms a mesh covering said opening of said bearing pin through which said light conducting means reaches said light source.

12. A steering column switch as claimed in claim 11 wherein said mesh of said switch lever has a collar and a circumferential recess into which said collar extends.

13. A steering column switch as claimed in claim 5 wherein:
   said bearing ring has an opening disposed perpendicular to said first axis providing access to said hollow portion of said bearing pin in which said light source is located; and
   said light conducting means is positioned inside said opening.

14. A steering column switch as claimed in claim 13 wherein said light conducting means is movable in said opening of said bearing ring in a direction perpendicular to said first axis.

15. A steering column switch as claimed in claim 13 wherein said switch lever covers said opening of said bearing ring through which said light conducting means reaches said light source.

16. A steering column switch as claimed in claim 15 wherein said switch lever forms a mesh covering said opening of said bearing ring through which said light conducting means reaches said light source.

17. A steering column switch as claimed in claim 16 wherein said mesh of said switch lever has a collar and a circumferential recess into which said collar extends.

18. A steering column switch as claimed in claim 1 wherein a first end of said light conducting means at which light from said light source enters said light conducting means is attached to said switch lever.

19. A steering column as claimed in claim 18 wherein said light source is disposed along said first axis.

20. A steering column switch as claimed in claim 19 wherein said light conducting means is aligned radially, with respect to said first axis, with said light source.

21. A steering column switch as claimed in claim 20 further comprising:
- at least one bearing pin located on said housing and having a hollow in which said light source is located; and
- at least one bearing ring located on said housing and engaging said bearing pin for pivotably mounting said switch lever within said housing.

22. A steering column switch as claimed in claim 21 further comprising a bottom positioned on said bearing pin wherein:
- said switching member contains a bore into which said switch lever projects; and
- said bottom closes the end, facing said bore, of said bearing pin.

23. A steering column switch as claimed in claim 21 further comprising a bottom positioned on said bearing ring wherein:
- said switching member contains a bore into which said switch lever projects; and
- said bottom closes the end, facing said bore, of said bearing ring.

24. A steering column switch as claimed in claim 21 wherein:
- said bearing pin has an opening disposed perpendicular to said first axis providing access to said hollow portion of said bearing pin in which said light source is located; and
- said light conducting means is positioned inside said opening.

25. A steering column switch as claimed in claim 24 wherein said light conducting means is movable in said opening of said bearing pin in a direction perpendicular to said first axis.

26. A steering column switch as claimed in claim 24 wherein said switch lever covers said opening of said bearing pin through which said light conducting means reaches said light source.

27. A steering column switch as claimed in claim 26 wherein said switch lever forms a mesh covering said opening of said bearing pin through which said light conducting means reaches said light source.

28. A steering column switch as claimed in claim 27 wherein said mesh of said switch lever has a collar and a circumferential recess into which said collar extends.

29. A steering column switch as claimed in claim 21 wherein:
- said bearing ring has an opening disposed perpendicular to said first axis providing access to said hollow portion of said bearing pin in which said light source is located; and
- said light conducting means is positioned inside said opening.

30. A steering column switch as claimed in claim 29 wherein said light conducting means is movable in said opening of said bearing ring in a direction perpendicular to said first axis.

31. A steering column switch as claimed in claim 29 wherein said switch lever covers said opening of said bearing ring through which said light conducting means reaches said light source.

32. A steering column switch as claimed in claim 31 wherein said switch lever forms a mesh covering said opening of said bearing ring through which said light conducting means reaches said light source.

33. A steering column switch as claimed in claim 32 wherein said mesh of said switch lever has a collar and a circumferential recess into which said collar extends.

34. A steering column switch as claimed in claim 2 wherein:
- said switch lever is attached to said switching member for pivotal movement about a second axis extending perpendicular to said first axis; and
- said first end of said light conducting means is movable relative to said switching member and said housing when said switch lever is pivoted about said second axis.

35. A steering column switch as claimed in claim 18 wherein:
- said switch lever is attached to said switching member for pivotal movement about a second axis extending perpendicular to said first axis; and
- said first end of said light conducting means is movable relative to said switching member and said housing when said switch lever is pivoted about said second axis.

* * * * *